H. H. COBE.
FASTENER.
APPLICATION FILED JUNE 28, 1917.

1,305,979.

Patented June 3, 1919.

Inventor.
Harry H. Cobe
by Heard Smith & Tennant
Atty's.

UNITED STATES PATENT OFFICE.

HARRY H. COBE, OF BOSTON, MASSACHUSETTS, ASSIGNOR TO BURD RING SALES COMPANY, OF BUFFALO, NEW YORK, A CORPORATION OF NEW YORK.

FASTENER.

1,305,979. Specification of Letters Patent. Patented June 3, 1919.

Application filed June 28, 1917. Serial No. 177,581.

*To all whom it may concern:*

Be it known that I, HARRY H. COBE, a citizen of the United States, residing at Boston, county of Suffolk, State of Massachusetts, have invented an Improvement in Fasteners, of which the following description, in connection with the accompanying drawing, is a specification, like characters on the drawing representing like parts.

This invention relates to separable fasteners of that type including in their construction a stud member and a socket member provided with means for releasably engaging the stud to lock the two members together, and means for automatically separating the two members when the stud is released. The objects of the invention are to provide the socket member of a fastener of this type with novel stud-engaging means and also with novel means for separating automatically the two members of the fastener when the stud is released.

In order to give an understanding of the invention, I have illustrated in the drawings a selected embodiment thereof which will now be described, after which the novel features will be pointed out in the appended claims.

In the drawings, Figure 1 is a sectional view through a fastener embodying my invention;

Figure 1:
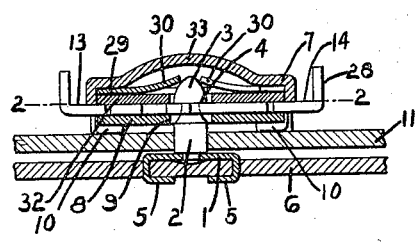
Figure 3:
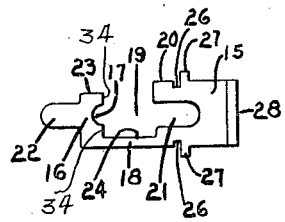
Fig. 3 is a view of one of the stud-retaining members.

The stud member of the fastener comprises a base portion 1 adapted to be fastened to one of the two separable parts to which the device is secured and having a stud 2 extending therefrom which is provided with a head 3, the latter being preferably a rounded head and constructed to form on its under side the shoulder 4 with which the stud-retaining means of the socket member have interlocking engagement. The body 1 of the stud member may be secured to the part to which it is to be fastened in any suitable way without departing from the invention. I have herein shown it as provided with two attaching prongs 5 which are adapted to be inserted through the material 6 to which it is to be secured, said prongs being clenched over to lock the stud member in place. The socket member comprises a shell 7 which may conveniently be stamped or formed from sheet metal and which is provided with a bottom 8 that is formed with a stud-receiving aperture 9. The bottom 8 is preferably formed from a disk or piece which is separate from the shell 7 and the two are fastened together by means of fingers 10 on the shell which are bent to overlie the bottom 8. The socket member is fastened to a part 11 and this may be accomplished in any suitable way. I have herein shown the shell 7 as provided with attaching prongs 12 which are adapted to be inserted through the material 11 and then clenched over to lock the socket member in place.

Figure 2:
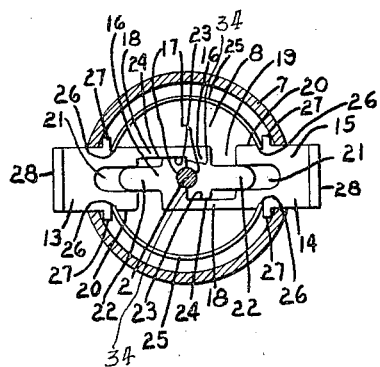
Fig. 2 is a section on the line 2—2, Fig. 1.

The socket member carries two stud-retaining members which are adapted to releasably engage the stud and by which the stud and socket members are locked together. These two stud-retaining members are indicated at 13 and 14, respectively, and they are similar in construction. Each comprises a body portion 15 which extends through and is adapted to slide in an aperture formed in the side wall of the shell 7, and each also is formed with a stud-engaging portion 16 which is adapted to engage the shoulder 4 of the stud and which has a notch 17 to fit the shank of the stud. The stud-engaging portion is connected to the body portion at one edge of the retaining member by the connecting portion 18 so that the member is formed with an opening 19 therein which extends from one edge 20 thereof to the connecting portion 18. The body is also provided with a guiding slot 21 and the stud-engaging portion 16 is provided with a guiding finger 22, the guiding finger of each member being of a size to fit the slot 21 of the other member. The two stud-retaining members 13 and 14 are situated opposite each other, and when in operative position the stud-engaging portion 16 of each member occupies the opening 19 in the other member and the edge 23 of each stud-retaining member fits against the edge 24 of the connecting portion 18 of the other member. Moreover, the guiding finger 22 of each member fits in the slot 21 of the other member. The two members are thus held in proper position relative to each other. The opening 19 of each stud-retaining member has a greater longitudinal dimension than the stud-engaging portion 16 thereof, and the guiding slot 21 of each member is longer than the guiding finger 22. As a result, when the two members are in their operative position, as shown in Fig. 2, they can be moved longitudinally relative to each other.

25 indicates springs situated within the casing and which tend to move the two stud-retaining members relative to each other in a direction to carry the stud-engaging portions 16 thereof toward each other. These springs have their ends seated in notches 26 formed in the sides of the two members, one end of each spring engaging one of the members, and the other end engaging the other member. Each stud-engaging member is also provided with ears 27 that are adapted to engage the interior wall of the shell 7 and thus limit the spring-impelled movement of said members. The outer end of each stud-retaining member is upturned, as shown at 28, to form a finger piece by which the members can be manipulated. The stud-engaging portions 16 are so shaped that when they are in operative position in engagement with the stud, as shown in Fig. 2, the edge 34 of each stud-engaging portion engages that of the other and the notches 17 are shaped so that when the two edges 34 are in engagement the two notches entirely encircle the shank of the stud. The stud-engaging members thus have engagement with the stud throughout the entire periphery of the latter, and this construction has the advantage that the stud cannot be disengaged from the socket by tipping or rocking the socket relative to the stud.

When the stud and socket elements are to be fastened together, the stud is inserted through the stud-receiving aperture 9 and the rounded head 3 of the stud engages the notches 17 and separates the stud-engaging portions 16 of the members 13 and 14 sufficiently to allow said head to enter between them. When the head has passed beyond the notches 17, then the springs 25 act to move the stud-retaining members 13 and 14 into position to cause the portions 16 thereof to lock underneath the shoulder 4 of the stud.

In order to separate the parts, pressure is applied to the two ends 28 of the stud-retaining members, thus moving said members inwardly and disengaging the portions 16 thereof from the stud.

Figure 4:
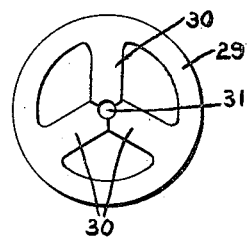
Fig. 4 is a plan view of the stud-ejecting element.
Figure 5:
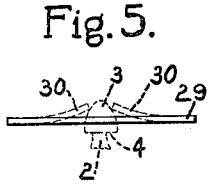
Fig. 5 is a side view of the stud-ejecting member showing the manner in which it operates on the stud.
Figure 7:
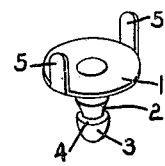
Fig. 7 is a view of the stud member.
Figure 6:
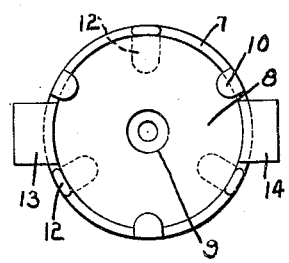
Fig. 6 is an underside view of the socket member of the fastener.

My invention also includes means operative automatically to separate the stud from the socket member when the stud is unlocked. The means I have herein shown for this purpose comprises a stud-ejecting member illustrated best in Figs. 4 and 5 and which is in the form of an annular washer or ring 29 which is situated within the shell 7 above the stud-retaining members 13 and 14 and which is provided with a plurality of inwardly-extending radial resilient arms 30. The inner ends of the arms 30 are so situated that when the stud member is inserted into the socket member, the end of the stud will engage the arms before the two members are brought fully into their operative position, so that during the final movement of the stud member into the socket member, the head 3 of the stud will deflect the spring arms 30, as shown in Fig. 1 and in dotted lines Fig. 5. When the two members are locked together, therefore, the flexed arms 30 exert a pressure on the stud tending to eject it from the socket member. This pressure is sufficient to automatically eject the stud from the socket member as soon as the stud is unlocked by the manipulation of the stud-retaining members 13 and 14.

The inner ends of the resilient arms 30 are shown as meeting each other when said arms are in their normal unflexed position, and the ends of the arms are each notched thereby to form a centering aperture 31 which receives the rounded end of the head 3 when the stud is inserted into the socket member thereby assisting in centering the stud. This centering aperture 31 is of less diameter than the head 3 of the stud so that it acts merely to center the stud without allowing the stud to pass therethrough.

32 indicates a disk or washer which is located within the shell 7 above the stud-retaining members 13 and 14. The disk 32 forms with the bottom 8 a chamber or space in which the stud-retaining members are received and guided. The shell 7 is formed with a dome-shaped portion 33 to make room for the head of the stud and the stud-ejecting arms 30.

An advantage of the construction herein employed for the stud-retaining members 13 and 14 is that each members acts as a guide for the other member so that the two members hold each other in proper position without the necessity of forming any guides on or in the casing.

Another advantage is that both of the members occupy the same plane, thus making it possible to reduce the thickness of the socket member.

While I have illustrated herein a selected embodiment of my invention, I do not wish to be limited to the constructional features shown.

I claim:

1. A separable fastener of the type comprising a stud member and a socket member provided with two similarly-shaped stud-retaining members, each presenting a body portion and each having a recess in one side adapted to receive the stud-engaging portion of the other stud-retaining member, characterized in that each stud-engaging portion is so shaped as to present a stud-engaging edge which meets and engages that of the other stud-engaging portion when the two stud-retaining members are in operative engagement with the stud, and each stud-engaging portion has a notch to partially embrace the stud.

2. A separable fastener of the type comprising a stud member and a socket member having two similarly-shaped stud-retaining members mounted therein and each comprising a body portion and a stud-engaging portion which is connected to the body portion by a connecting portion situated at one side of said member, and each stud-engaging portion also having a guiding finger which operates in a slot in the other stud-retaining member, characterized in that the stud-engaging portion of each stud-retaining member bears against and has sliding contact with the edge of the connecting portion of the other stud-retaining member, and in that the edges of the two stud-engaging portions which face each other are in contact when the stud-retaining members are in operative position.

3. In a separable fastener, the combination with a stud member, of a socket member, stud-retaining means carried by the socket member, and a stud-ejecting member also carried by the socket member and presenting an annular body having a plurality of radial inwardly-directed resilient arms adapted to engage the stud when it is locked to the socket member.

4. In a separable fastener, the combination with a stud member, of a socket member, stud-retaining means carried by the socket member, and a stud-ejecting member also carried by the socket member, said stud-ejecting member presenting a disk-like shape and having a transversely-resilient central portion that is engaged and displaced laterally by the stud when the latter is locked to the socket member whereby when the stud is released, the resiliency of said central portion will eject the stud.

5. In a separable fastener, the combination with a stud member, of a socket member, stud-retaining means carried by the socket member, and stud-ejecting means comprising a plurality of resilient radial arms anchored at their outer ends but free at their inner ends, said inner ends of the arms being situated to be engaged and displaced laterally by the stud when it is inserted into the socket member.

In testimony whereof, I have signed my name to this specification.

HARRY H. COBE.

Copies of this patent may be obtained for five cents each, by addressing the "Commissioner of Patents, Washington, D. C."